United States Patent
Janssen et al.

(10) Patent No.: US 12,012,496 B2
(45) Date of Patent: Jun. 18, 2024

(54) METHOD FOR THE MANUFACTURE OF A COLORED POLYMER COMPOSITION

(71) Applicant: SABIC GLOBAL TECHNOLOGIES B.V., Bergen op Zoom (NL)

(72) Inventors: Pieter Jan Antoon Janssen, Geleen (NL); Tamara Marijke Eggenhuisen, Geleen (NL); Abraham Johan Van Veen, Geleen (NL); Joshua Arie Van Den Bogerd, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 736 days.

(21) Appl. No.: 17/059,651

(22) PCT Filed: May 24, 2019

(86) PCT No.: PCT/EP2019/063507
§ 371 (c)(1),
(2) Date: Nov. 30, 2020

(87) PCT Pub. No.: WO2019/233791
PCT Pub. Date: Dec. 12, 2019

(65) Prior Publication Data
US 2021/0214519 A1  Jul. 15, 2021

(30) Foreign Application Priority Data
Jun. 5, 2018  (EP) .................................... 18175962

(51) Int. Cl.
| | | |
|---|---|---|
| *C08K 3/013* | (2018.01) | |
| *C08J 3/00* | (2006.01) | |
| *C08J 3/20* | (2006.01) | |
| *C08J 3/22* | (2006.01) | |
| *C08K 5/11* | (2006.01) | |
| *C08K 5/3472* | (2006.01) | |
| *C08K 5/524* | (2006.01) | |
| *C08L 69/00* | (2006.01) | |

(52) U.S. Cl.
CPC .............. *C08K 3/013* (2018.01); *C08J 3/005* (2013.01); *C08K 5/11* (2013.01); *C08K 5/3472* (2013.01); *C08K 5/524* (2013.01); *C08L 69/00* (2013.01); *B29K 2995/002* (2013.01); *C08J 3/20* (2013.01); *C08J 3/203* (2013.01); *C08J 3/22* (2013.01); *C08J 3/223* (2013.01); *C08J 2369/00* (2013.01)

(58) Field of Classification Search
CPC .............. B29K 2995/002; C08L 69/00; C08J 2369/00; C08J 3/20; C08J 3/22; C08J 3/203; C08J 3/223
See application file for complete search history.

(56) References Cited

U.S. PATENT DOCUMENTS

| | | | |
|---|---|---|---|
| 4,444,714 A | 4/1984 | Martenson | |
| 5,116,547 A | 5/1992 | Tsukahara et al. | |
| 2002/0013397 A1 | 1/2002 | Masayasu et al. | |
| 2003/0124351 A1* | 7/2003 | Sakamoto | G11B 7/253 |
| | | | 428/397 |
| 2014/0295160 A1 | 10/2014 | Meyer et al. | |
| 2015/0225530 A1* | 8/2015 | Smetana | B82Y 30/00 |
| | | | 106/400 |
| 2015/0344669 A1 | 12/2015 | Schellekens et al. | |
| 2017/0145236 A1* | 5/2017 | Harada | G03G 9/0918 |

FOREIGN PATENT DOCUMENTS

| | | | | |
|---|---|---|---|---|
| EP | 0365400 A2 | 4/1990 | | |
| EP | 0370424 A2 | 5/1990 | | |
| GB | 2070048 A | * | 9/1981 | ............... C08J 3/22 |
| GB | 2055115 B | * | 4/1983 | ............... C08J 3/22 |
| WO | 2014203173 A1 | 12/2014 | | |
| WO | 2015132740 A1 | 9/2015 | | |
| WO | 2016142447 A1 | 9/2016 | | |

OTHER PUBLICATIONS

International Search Report; International Application No. PCT/EP2019/063507; International Filing Date: May 24, 2019; dated Jul. 5, 2019; 13 pages.
Written Opinion; International Application No. PCT/EP2019/063507; International Filing Date: May 24, 2019; dated Jul. 5, 2019; 13 pages.

* cited by examiner

*Primary Examiner* — Kregg T Brooks
*Assistant Examiner* — David R. Foss
(74) *Attorney, Agent, or Firm* — CANTOR COLBURN LLP

(57) ABSTRACT

Method for the manufacture of a colored polymer composition comprising a polymer, a release agent and a colorant, the method comprising the steps of feeding a solid form of a release agent composition comprising said release agent and said colorant to a feed section of a melt mixing device, feeding said polymer to said melt mixing device and mixing said release agent composition and said polymer in said melt mixing device at a temperature above the melting temperature of said polymer, wherein—said colorant is a pigment, or a dye which is soluble in said release agent, —said polymer comprises or consists of polycarbonate, —the release agent is selected from the group consisting of penta-erythritol tetra stearate, glycerol monostearate, glycerol tristearate and mixtures thereof.

8 Claims, No Drawings

METHOD FOR THE MANUFACTURE OF A COLORED POLYMER COMPOSITION

This application is a National Stage application of PCT/EP2019/063507, filed May 24, 2019, which claims the benefit of European Application No. 18175962.2, filed Jun. 5, 2018, both of which are incorporated by reference in their entirety herein.

The present invention relates to a method for the manufacture of a colored polymer composition comprising a polymer, a release agent and a colorant. The present invention further relates to a method for the manufacture of a batch of semi-finished or finished articles, to the use of a particulate form of a release agent composition and to a release agent composition.

Articles comprising or consisting of a colored polymer composition are generally prepared using a variety of techniques including sheet extrusion, profile extrusion, injection moulding, blow moulding, rotation moulding and compression moulding. Generally these techniques include the use of a pre-made colored polymer composition containing the polymer, a colorant, a release agent and any further additive as required for the intended application. Thus, in general these techniques are primarily directed at the shaping of a colored polymer composition rather than in preparing the composition as such. It is common in the polymer industry to manufacture colored polymer compositions that can be used directly, i.e. without any further modification, to form articles.

Another approach in preparing colored articles of a colored polymer composition is to prepare color concentrates, or masterbatches, and to combine a base polymer composition in situ, i.e. during the manufacture of the article, with such a color concentrate. This generally allows for more flexibility in terms of varying the color of the article yet has the disadvantage that it requires the use of multiple components at the location of article manufacture, rendering the article manufacturing more complex in terms of logistics and requiring article manufacturing equipment that allows handling of more than one component.

Regardless of the foregoing, an important aspect of colored articles is that these articles have a certain color consistency. Thus it is desirable that color variations between articles as well as within each single article are reduced to a minimum.

Colored polymer compositions include one or more colorants such as dyes and/or pigments. In view of the aforementioned color consistency it is important that the pigment or dye is dispersed or dissolved evenly within the polymer composition. Put differently, the color consistency requirement on the articles can be translated to the dispersion or dissolution of the pigment and/or dye in the polymer composition.

U.S. Pat. No. 5,116,547 discloses a method of coloring a polycarbonate extruded or molded product for optical members, which is colored by a liquid coloring process for obtaining a colored polycarbonate extruded or molded product for optical members by extrusion or injection molding. The process involves mixing a polycarbonate resin for optical members and a liquid coloring agent dispersion obtained by dispersing a coloring agent in a dispersing agent. The dispersing agent includes a specific saturated fatty acid ester or silicon oil. After mixing the polycarbonate resin and liquid coloring agent dispersion, the resulting mixture is melted and thereafter extruded or molded to form a product for optical members. Exemplified dispersing agents include butyl stearate, linseed oil, dimethylpolysiloxane, methylphenylpolysiloxane, PE wax, paraffin wax and an ester of an oxyalkylene. The present inventors found that the liquid coloring process of U.S. Pat. No. 5,116,547 is relatively complex and requires specific liquid feed equipment to an extruder. Without willing to be bound to it, the present inventors further believe that feeding a liquid dispersion to the feed section of an extruder may cause instability in the formation of a stable melt inside the extruder, which the present inventors defined as surging. In addition to that the liquid feeding technology as disclosed in U.S. Pat. No. 5,116,547 may require accurate pressure control within the feeding device.

US 2002/0013397 discloses a coloring resin composition comprising a dispersing agent, a pigment and a thermoplastic resin; wherein the dispersing agent is expressed by the formula $CH_{2n+1}(OCH_2CH_2)_mOH$ and the thermoplastic resin is metallocene polyolefin, wherein n is an integer of 1 to 100, and m is an integer of 1 to 100.

U.S. Pat. No. 4,444,714 discloses a stable liquid gel of colorants useful for incorporation in thermoplastic and thermosetting resins. The liquid gel comprises a liquid vehicle which is a plasticizer for the resins and which is gelled by an organophilic, expanding lattice clay which is ion exchanged with alkyl ammonium ions.

WO2016/142447 discloses a masterbatch for coloring of thermoplastic polymer compositions, said masterbatch comprising a colorant in a total amount of 10-50% (w/w) relative to the total weight of the masterbatch, a dispersing agent in a total amount of 0.5-20% (w/w) relative to the total weight of the masterbatch and a carrier resin in a total amount of 30-80% (w/w) relative to the total weight of the masterbatch, wherein the dispersing agent is a polyol poly(hydroxy fatty acid) ester (pphe dispersing agent).

US 2014/0295160 discloses a process for the production of a multi-layer body having a deep-gloss appearance, comprising the steps of preparing a carbon-black-containing masterbatch with demoulding agent, preparing a compound comprising polycarbonate and the carbon-black-containing masterbatch, wherein the carbon black is in an amount of from 0.05 to 0.15 wt. %, and the demoulding agent is in a concentration of from 0.1 to 0.5 wt. %, producing a moulding, coating of the moulding with a scratch-resistant layer in a one-stage coating process. In an example the masterbatch is a carbon black/pentaerythritol tetrastearate masterbatch comprising 58% carbon black.

EP 0365400 discloses a method for producing a filler-containing colored thermoplastic resin composition superior in pigment dispersibility and impact resistance, the method comprises melt kneading firstly at least a part of components of resin consisting of a thermoplastic resin (A) and/or a thermoplastic resin composition (B) with fillers (C), adding remainder of the resin, if any, with a pigment (E), and then further carrying out continuous melt-kneading.

US 2015/0344669 discloses a method for injection moulding an article having a thickness of between 1 to 3 mm and having a b value in the CIE colour system of between −1 and +0.1 and a haze value of less than 2%, as measured at 2 mm thickness, comprising the steps of a) Providing a composition comprising i) a polyester produced by copolymerizing, in the presence of an aluminum or germanium compound, at least three monomers chosen from at least one alkylenediol and at least one dicarboxylic acid component, ii) from 1 to 5 ppm of at least one dye and iii) from 0.1 to 0.5 m % of a fatty acid ester mould release agent and b) Injecting the composition in a mould at a temperature of below 60° C. until the mould is filled and c) Ejecting the article. This reference further discloses a composition comprising A) a polyester produced by copolymerizing 1,2-ethanediol and two dicarboxylic acid components in the presence of a germanium compound, the dicarboxylic acid components comprising a terephthalic acid component and 4-20 mol % of an isophthalic acid component, the mol % being relative to the total amount of the dicarboxylic acid component, characterised that the composition further comprises, B) from 0.2 to 1.5 ppm of at least one dye, C) from 0.1 to 0.5 m % of stearylstearate or glyceroltristearate and to an article having a wall thickness of between 1 and 3 mm comprising this composition.

EP 0370424 discloses a resin composition for masterbatch, which comprises 5 to 90 wt. % of modified polyolefin resin and 5 to 70 wt. % of carbon black having a mean particle size of 15 to 120 micrometer and an oil absorption value of more than 50 ml/100 g of which volatile components are less than 3.5 wt. %.

It is an object of the invention to provide a method for the manufacture of a colored polymer composition, which allows the manufacture of articles having improved color consistency.

It is a further object of the present invention to provide a method for the manufacture of a colored polymer composition which is cost-effective and does not require major modification of existing equipment such as in particular extruders.

It is in particular an object of the present invention to provide a cost-effective and robust method for the manufacture of a colored polycarbonate composition, which allows the manufacture of polycarbonate articles having improved color consistency.

One or more of these objects are met, at least in part, in accordance with the present invention which is directed at a method for the manufacture of a colored polymer composition comprising at least one polymer, a release agent and a colorant, the method comprising the steps of feeding a solid form of a release agent composition comprising said release agent and said colorant to a feed section of a melt mixing device, feeding said polymer to said melt mixing device and mixing said release agent composition and said polymer in said melt mixing device at a temperature above the melting temperature of said polymer wherein said colorant is a pigment, or a dye which is soluble in said release agent, said polymer comprises or consists of polycarbonate, the release agent is selected from the group consisting of penta-erythritol tetra stearate, glycerol monostearate, glycerol tristearate and mixtures thereof.

The present inventors surprisingly found that this method will result in polymer compositions, in particular polycarbonate compositions, that show an improved color consistency.

The present invention is directed at compositions based on polycarbonate. Accordingly, the polymer in the composition comprises or consists of polycarbonate. If the polymer comprises polycarbonate the amount of polycarbonate is preferably at least 60 wt. %, preferably at least 80 wt. %, more preferably at least 90 wt. % based on the weight of the polymer. That is, the polymer comprises polycarbonate in a major portion and other polymers, if any, in a minor portion. For example the polymer may be a mixture of polycarbonate with one or more of polyethylene terephthalate, polybutylene terephthalate, polymethylmethacrylate, polyester copolymers, acrylonitrile-butadiene-styrene copolymer, styrene acrylonitrile copolymer. For the avoidance of doubt polycarbonate copolymers or polyester-co-carbonate polymers are considered as polycarbonate.

In a preferred embodiment the polymer comprises or consists of an aromatic polycarbonate or a mixture of at least two aromatic polycarbonates. Similarly in the aforementioned blends the polycarbonate is preferably aromatic polycarbonate. Preferably the aromatic polycarbonate is a bisphenol A derived polycarbonate. Bisphenol A derived polycarbonate is well known to a skilled person and may be prepared by the melt transesterification process involving the transesterification of bisphenol A and diphenyl carbonate, or by the interfacial process involving the reaction of phosgene with bisphenol A. Such polycarbonates are generally referred to as polycarbonate homopolymers.

In an embodiment the polycarbonate is polycarbonate copolymer or a mixture of a polycarbonate copolymer and a polycarbonate homopolymer. Polycarbonate copolymers are known per se and examples include block copolymers of polyorganosiloxane, such as poly-dimethyl-siloxane, and polycarbonate. If the polycarbonate is a mixture of a polycarbonate copolymer and a polycarbonate homopolymer then the amount of polycarbonate homopolymer may be at least 80 wt. %, preferably at least 90 wt. %, more preferably at least 95 wt. % of polycarbonate homopolymer, based on the total weight of polycarbonate polymer.

Notwithstanding the aforementioned preferred polymers, other polymers that may find application in the present invention are polyethylene, polypropylene, ethylene propylene copolymers, propylene ethylene copolymers, ethylene (meth)acrylate copolymers, polyvinylchloride, polyamide, polyetherimides, polyether-ether-ketone and polyvinylsulfone. Such polymers, if present, will by definition form a minor portion of the polymer in the composition.

The polymer composition comprises the polymer, a release agent and a colorant. Preferably the amount of release agent is from 0.01-1.0 wt. % and the amount of colorant is from 0.1-1000 ppm weight based on the weight of the sum of the polymer, the release agent and the colorant in said polymer composition.

It is preferred that the amount of release agent is from 0.1 to 1.0 wt. %, more preferably from 0.3 to 0.8 wt. % based on the weight of the sum of the polymer, the release agent and the colorant in said polymer composition. If the amount of release agent is too high it may result in undesirable deposition of the same on the moulds, cooling rolls, calender rolls or extrusion dies requiring more frequent cleaning and hence a reduced output. In addition it may also impact other properties like impact performance and flame retardance. If the amount of release agent is too low the release performance of the polymer composition is insufficient.

The amount of colorant is generally selected so as to obtain the desired color intensity. In the polymer composition the amount of colorant may be from 0.1-1000 ppm by weight.

The polymer composition may comprise further additives and/or fillers such as inorganic fillers.

The colorant may be a pigment or a dye suitable for providing the desired color tone to the polymer. The skilled person knows how to select the appropriate colorant based on the type of polymer. In the context of the present invention the colorant should be soluble in the release agent. Colorants that are not soluble may bleed out of the release agent over time causing undesirable problems upon storage or transport of the release agent composition, contamination of the feed sections (or any other transport sections, such as piping) of or close to the melt mixing device, and/or an inconsistent colortone of articles produced on the basis of the colored release agent composition.

Put differently, the colorant is a pigment or a dye that is soluble in the release agent being applied. Preferably the colorant is a dye which is soluble in the release agent, for the reason that this allows the manufacture of a stable release agent composition, i.e. a release agent composition wherein the amount of colorant is stable over time.

Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Preferably organic pigments are used over inorganic pigments and it is preferred that the colorant does not comprise inorganic pigments.

More preferably however the colorant is a dye which is soluble in the release agent. Such dyes may be of a methane type, an anthraquinone type, a perylene type, a thioindigo type, phthalocyanine type, a cumarine type, a bisbenzoxazylphthalene type or an oxazole stilbene type. Examples of organic dyes which may be employed are triphenyl methane, oxazine, thiazine, nitromethine, azodyestuifs and anthraquinone dyes. Among the azo-dyes there may be mentioned, for example, diazo-dyes and especially monoazodyes, for example, those of the benzene-azo-benzene, benzene azo pyrozolone, benzene-azo-acetoacetic acid arylide or benzene-azo-naphthalene series. The monoazodyes may contain further substituents of the kind customary in azo dyes and which do not react with polycarbonates. Other dyes which are suitable for use in the present invention are anthraquinone dyes. Preferably the dye is selected from the group consisting of Solvent Green 3, Solvent Green 28, Solvent Green 38, Solvent Red 52, Solvent Red 101, Solvent Red 111, Solvent Red 135, Solvent Red 169, Solvent Red 179, Solvent Red 207, Disperse Red 22, Vat Red 41, Solvent Orange 60, Solvent Orange 63, Disperse Orange 47, Solvent Violet 13, Solvent Violet 14, Solvent Violet 36, Solvent Violet 50, Disperse violet 26/31, Disperse Blue 73, Solvent Blue 97, Solvent Blue 101, Solvent Blue 104, Solvent Blue 122, Solvent Blue 138, Disperse Yellow 201, Solvent Yellow 33, Solvent Yellow 114, Solvent Yellow 93, Solvent Yellow 98, Solvent Yellow 163, Solvent Yellow 160:1, Solvent Yellow 188, and mixtures of at least two of the foregoing colorants. These colorants are compatible with polycarbonate containing polymer compositions and are soluble and/or disperse well in release agents such as penta-erythritol, glycerol mono-stearate, glycerol tri-stearate and mixtures thereof.

In a preferred embodiment the colorant is selected from the group consisting of Solvent Green 3, Solvent Green 28, Solvent Green 38, Pigment Green 50, Pigment Green 36, Solvent Red 52, Solvent Red 101, Solvent Red 111, Solvent Red 135, Solvent Red 169, Solvent Red 179, Solvent Red 207, Pigment Red 101, Disperse Red 22, Vat Red 41, Solvent Orange 60, Solvent Orange 63, Disperse Orange 47, Solvent Violet 13, Solvent Violet 14, Solvent Violet 36, Solvent Violet 50, Disperse violet 26/31, Pigment Blue 29, Pigment Blue 60, Copper Phthalocyanine Pigment Blue 15.4, Phthalocyanine Blue BN, Pigment Blue PB 15, Disperse Blue 73, Solvent Blue 97, Solvent Blue 101, Solvent Blue 104, Solvent Blue 122, Solvent Blue 138, Pigment Yellow 53, Pigment Yellow 138, Pigment Yellow 139, Disperse Yellow 201, Solvent Yellow 33, Solvent Yellow 114, Solvent Yellow 93, Solvent Yellow 98, Solvent Yellow 163, Solvent Yellow 160:1, Solvent Yellow 188, Pigment Brown 24, Amino Ketone Black, chrome oxides and mixtures of at least two of the foregoing colorants. These colorants are compatible with polycarbonate containing polymer compositions and are soluble and/or disperse well in release agents such as penta-erythritol tetra stearate, glycerol mono-stearate, glycerol tri-stearate and mixtures thereof.

The composition does not comprise carbon based pigments, such as carbon black, channel black or pigment black 6.

The colorant may be a single dye, a mixture of dyes, a single pigment, a mixture of pigments or a mixture of one or more dyes and one or more pigments.

In the field of polymer compositions a release agent is known as a material that allows an article prepared from a polymer composition containing said release agent to be released from a surface more easily as compared to an otherwise identical polymer composition not containing a release agent. For example release agents are commonly employed in polymer compositions from which injection moulded articles are prepared. The release agent allows the injection moulded article to be removed from a mould more easily, i.e. with less force. For articles prepared by means of extrusion the release agent allows improved release from or reduced friction with surfaces, such as for example the surface of calender rolls or cooling rolls.

A skilled person will appreciate that the type of release agent to be employed depends on the type of polymer.

In the context of the present invention the release agent has a melting point sufficiently above room temperature allowing it to be used as a solid material in a production environment. Preferably the melting point of the release agent is at least 50° C., preferably from 50-100° C., more preferably from 50-85° C. In this context it is noted that the melting ranges, for penta-erythritol tetra stearate, glycerol monostearate, glycerol tristearate are from 60-66° C., 57-65° C. and 72-75° C. respectively.

The use of these release agents in combination with compositions comprising or consisting of polycarbonate as the polymer is known for example from WO2014/203173 and WO2015/132740.

According to the invention the release agent is pentaerythritol tetra stearate, glycerol mono stearate, glycerol tristearate or mixtures of at least two of these release agents. That is, the release agent in the context of the invention is selected from the group consisting of penta-erythritol tetra stearate, glycerol monostearate, glycerol tristearate and mixtures thereof. Thus, the release agent can be penta-erythritol tetra stearate, glycerol monostearate, glycerol tristearate, or a mixture of penta-erythritol tetra stearate, and glycerol monostearate, a mixture of penta-erythritol tetra stearate and glycerol tristearate or a mixture of glycerol monostearate and glycerol tristearate or a mixture of penta-erythritol tetra stearate, glycerol monostearate and glycerol tristearate.

For the avoidance of doubt it is noted that the material pentaerythritol tetra stearate is to be understood the material that is registered under CAS #115-83-3.

The release agent composition in the context of the present invention is a composition in a particulate form (at room temperature) and contains a colorant and at least 40 wt.

%, such as from 40-99 wt. %, or 50-95 wt. % of a release agent based on the weight of the release agent composition. The composition is preferably in the form of pellets, powder, beads or flakes. Such forms are know to a skilled person.

The release agent acts as a carrier material for the said colorant. In turn, the colorant is dissolved in the release agent. The release agent composition may also contain further functional additives such as UV stabilisers, antioxidants hydrolytical stabilisers, flame retardants, catalyst quenchers, anti-static agents and the like. A catalyst quencher is a material that de-activates catalyst remaining in the polymer after its polymerisation. In an embodiment where the polymer is polycarbonate manufactured using the melt transesterification process the preferred catalyst quencher is butyl tosylate.

It is preferred that the release agent composition comprises at least 40 wt. %, more preferably at least 50 wt. % of the release agent, based on the weight of the release agent composition. The amount of colorant depends on the desired color tone of the final article, yet may be from 0.0001-0.1 wt. % based on the weight of the release agent composition.

For the avoidance of doubt the release agent composition does not comprise a carrier resin or carrier polymer.

In the method for the manufacture of a colored polymer composition according to the invention the solid form of the release agent consists of one or more of pellets, powder, flakes or beads.

The release agent composition can be manufactured by mixing the release agent, the colorant and optionally further functional additives at a temperature above the melting temperature of the release agent. The mixing allows the manufacture of a homogeneous mixture, which is consecutively cooled to a temperature below the melting temperature of the release agent and shaped into particulate form such as pellets, powder, beads or flakes using commonly known techniques. In an alternative method of manufacture the release agent composition, while at a temperature above the melting temperature of the release agent, is divided into droplets after which the release agent composition is cooled to a temperature below the melting temperature of the release agent. This embodiment directly results in powder, beads or pellets, depending on the droplet size. By allowing the droplets to cool on a surface pellets or beads having one flat and one rounded surface may be obtained. Flakes made be made in a known manner such as by cooling the molten release agent composition on a cooling roll upon which the composition solidifies and is scraped off so as to form flakes.

In a preferred embodiment the release agent composition comprises or consists of:
At least 60.0 wt. % of a release agent selected from pentaerythritol tetra stearate, glycerol monostearate, glycerol tri-stearate or mixtures of at least two of the foregoing release agents,
from 0-40 wt. % of a UV stabiliser
from 0.0001-0.1 wt. % of at least one dye which is soluble in said release agent wherein the amounts are based on the total weight of the release agent composition and the release agent composition totaling 100 wt. %.

The colored polymer composition is manufactured using a melt mixing device, preferably an extruder. The extruder is provided with a feed section for feeding the solid form of release agent composition to the extruder. The polymer may be fed to the extruder in solid or molten form. For example, the polymer may be fed to the feed section of an extruder in the form of powder, beads or pellets. The location of the said polymer feed section may be the same or different from the feed section of the release agent composition. It is also possible to pre-mix the solid form of release agent composition and solid form of polymer followed by feeding the so obtained mixture of solids to the feed section of an extruder. A molten stream of polymer may be fed to an extruder via a separate feed system. The molten stream may be obtained by means of an additional extruder wherein the polymer is melted and extruded into the melt mixing device wherein the solid form of release agent is added. Alternatively the molten stream of polymer originates from the final reactor in a polymer plant, such as for example a melt polycarbonate plant. The colored polymer composition as formed in the extruder may be extruded through an extrusion die, cooled and cut into pellets.

The colored polymer composition may be used for the manufacture of semi-finished or finished articles by means of known conversion techniques including but not limited to injection moulding, blow moulding, sheet extrusion, profile extrusion, rotation moulding and compression moulding.

In an embodiment the extruder is connected to an injection moulding die and the molten colored polymer composition is directly used for the manufacture of (a batch of) finished or semi-finished injection moulded articles. In another embodiment the extruder is connected to an extrusion die and the molten colored polymer composition is directly used for the manufacture of finished or semi-finished extruded articles, such as sheets, panels, profiles, multi-wall panels and the like.

The present invention further relates to a colored polymer composition obtained or obtainable by the method of the present invention. In particular the present invention relates to a colored polymer composition comprising a polymer, a release agent and a colorant obtained or obtainable by a method comprising the steps of feeding a solid form of a release agent composition comprising said release agent and said colorant to a feed section of a melt mixing device, feeding said polymer to said melt mixing device and mixing said release agent composition and said polymer in said melt mixing device at a temperature above the melting temperature of said polymer, wherein the polymer is polycarbonate and the release agent is selected from the group consisting of penta-erythritol tetra stearate, glycerol monostearate, glycerol tristearate and mixtures thereof, preferably penta-erythritol tetra stearate.

Color values (dE*, L*, a*, b*) were be calculated according to ASTM E308-15 (Standard Practice for Computing the Colors of Objects by Using the CIE System) using spectral transmission data for D65 illumination and 10° observer. Transmission spectra may be collected on an X rite i7 spectrophotometer. Color difference is calculated according to the CIE 1976 color difference equation:

$$dE^* = \sqrt{dL^{*2} + da^{*2} + db^{*2}}$$

wherein
dE*=the color difference
dL*=the difference in L* value compared to a reference L* value
da*=the difference in a* value compared to a reference a* value
db*=the difference in b* value compared to a reference b* value Color measurements were carried out on injection moulded plaques having a thickness of 4 mm.

The colored polymer composition preferably has an average dE* value of at most 0.050, wherein a dE* value is calculated using the formula above and wherein said average dE* value is determined on a quantity of colored polymer composition of between 2000 and 5000 kg and wherein the color values (L*, a*, b*) of at least 10 and at most 20 samples were measured at regular intervals during the manufacture of the said quantity. The reference for determining dE* for each sample consists of the average L*, a* and b* calculated on the basis of all measurements within the quantity of colored polymer composition.

EXAMPLES

The present invention will now be further elaborated based on the following non-limiting examples.

The following release agent compositions, referred to as A and B were prepared by mixing the respective ingredients at a temperature of about 70° C. followed by forming more or less circular pellets from said molten composition by allowing droplets of the molten release agent composition to cool on a flat surface. The pellets had a diameter of about 3 mm and a maximum thickness of between about 1 and 2 mm.

The amounts are in parts by weight. The compositions A and B did not contain any further materials. The sum of the weight of the components in table 1 adds up to 100 parts by weight for each of the compositions A and B.

TABLE 1

| CAS # | | Material | A | B |
|---|---|---|---|---|
| 115-83-3 | Release agent | penta-erythritol tetrastearate | ~99.98 | ~66.66 |
| 31570-04-4 | Antioxidant | tris (2,4-di-t-butylphenyl) phosphite | | 8.33 |
| 3147-75-9 | UV stabiliser | 2-(2-hydroxy-5-t-octylphenyl) benzotriazole | | 25.00 |
| 82-16-6 | colorant | Solvent Violet 36 | 0.0132 | 0.00882 |
| 147-14-8 | colorant | Pigment Blue PB 15 | 0.00330 | 0.00221 |

Based on the raw materials and the release agent compositions A and B the following colored polymer compositions were manufactured. All example polymer compositions were manufactured with identical settings using a co-rotating twin screw extruder. The extruder had a length of 2880 mm (8 barrels), a screw diameter of 92 mm and operated at a screw speed of 600 rpm delivering an output of about 2500 kg/hr. The barrel temperature in the wetted length and the temperature of the die head was set to 300° C. The extruder was equipped with a bulk feeder for feeding the polymer in the form of powder, a blender feeder for feeding a blend of individual components in comparative examples 1 and 2 and a pellet feeder for feeding the pellets of compositions A and B. The bulk feeder, blender feeder and pellet feeder all fed the respective materials to the same feed section in the extruder located at the first barrel. The colored polymer compositions were extruded to a strand which was cooled and cut into pellets.

Samples of the obtained pellets were taken at regular intervals during the manufacture of the compositions. These samples were dried and injection moulded into sets of 5 plaques of about 6 cm by 6 cm and having a thickness of 4 mm.

The color of the plaques was measured using a color spectrophotometer applying the CieLAB system resulting in L*, a*, b* values for each plaque. For the purpose of the examples in the present application the L*, a* and b* value for each sample was the average value of the 5 plaques per sample.

For the calculation of dE* the reference consisted of the average value for L*, a* and b* which was based on all plaques measured within an example composition.

The reported average dE* in Table 3 below is the average of all individual dE* measurements within the example composition.

The reported max dE* represents the value of dE* for the sample having the highest determined color difference.

Thus, in Comparative Example 1 (CE1) 16 samples were taken at regular intervals during the manufacture of the colored polymer composition. From each of these 16 samples five plaques of 4 mm thickness were prepared via injection moulding. Each plaque was subjected to color measurement using the CIElab system resulting in a dataset of 16 times 5 individual color measurements. The average color values for L*, a* and b* formed the reference values for calculation of the dE* following the formula above.

TABLE 2

| CAS # | Material | CE1 | CE2 | E1 | E2 |
|---|---|---|---|---|---|
| | | Bulk feeder | | | |
| | Polycarbonate | 90.0 | 90.0 | 90.0 | 99.4 |
| | | Blender feeder | | | |
| 115-83-3 | penta-erythritol tetrastearate | 0.4 | 0.4 | | |
| 31570-04-4 | tris (2,4-di-t-butylphenyl) phosphite | 0.05 | 0.05 | 0.05 | |
| | Polycarbonate | 9.40 | 9.40 | 9.4 | |
| 3147-75-9 | 2-(2-hydroxy-5-t-octylphenyl) benzotriazole | 0.15 | 0.15 | 0.15 | |
| 82-16-6 | Solvent violet SV36 | 0.000048 | 0.000048 | | |
| 147-14-8 | Pigment Blue PB 15 | 0.000012 | 0.000012 | | |
| | | Pellet feeder | | | |
| Mix A | | | | 0.4 | |
| Mix B | | | | | 0.6 |

The polycarbonate fed via the bulk feeder and via the blender feeder was identical and consisted of a linear bisphenol A polycarbonate having a Mw of about 30500 g/mol (PC standard) and a melt volume rate of about 6.0 cm$^3$/10 min (ISO 1133, 300° C., 1.2 kg). The polycarbonate was prepared using the interfacial process wherein bisphenol A reacts with phosgene and the resulting polymer powder was fed to bulk and blender feeder of the extruder.

Table 3 shows the color variation as measurements on plaques prepared from the examples.

TABLE 3

| | CE1 | CE2 | E1 | E2 |
|---|---|---|---|---|
| # of samples in lot | 16 | 24 | 25 | 19 |
| Average dE* | 0.088 | 0.072 | 0.032 | 0.047 |
| Max dE* | 0.2 | 0.166 | 0.076 | 0.122 |

The results in Table 3 show that upon the use of release agent composition containing the colorant the color variation in moulded plaques, i.e. articles, can be significantly reduced. The present inventors believe that this observed improved color consistency means that the concentration of the colorant in articles prepared from the polymer composition shows less variation.

The invention claimed is:

1. A method for the manufacture of a colored polymer composition comprising a polymer, a release agent and a colorant, the method comprising the steps of
feeding a solid form of a release agent composition comprising said release agent and said colorant to a feed section of a melt mixing device, and
separately feeding said polymer to said melt mixing device and mixing said release agent composition and said polymer in said melt mixing device at a temperature above the melting temperature of said polymer, wherein
said colorant is a pigment, or a dye which is soluble in said release agent,
said polymer composition comprises polycarbonate, and
the release agent consists of penta-erythritol tetra stearate, glycerol monostearate, glycerol tristearate or a mixture thereof,
wherein the composition does not comprise carbon based pigments,
wherein the release agent composition comprises
60 to 99 wt. % of the release agent based on the weight of the release agent composition;
0.001 to 0.1 wt. % of the colorant based on the weight of the release agent composition; and
0 to 40 wt. % of a UV stabilizer based on the weight of the release agent composition; and
wherein the polymer comprises 90 to 100 wt. % of a polycarbonate or a mixture of at least two aromatic polycarbonates based on the weight of the polymer.

2. The method of claim 1 wherein the solid form of the release agent composition consists of one or more of pellets, powder, flakes or beads.

3. The method of claim 1 wherein the release agent composition further comprises one or more functional additives, wherein the one or more functional additives comprises anti-oxidants, UV stabilisers, hydrolytical stabilisers, flame retardants, catalyst quenchers, anti-static agents or a mixture thereof.

4. The method of claim 1 wherein the polymer consists of an aromatic polycarbonate or a mixture of at least two aromatic polycarbonates.

5. The method of claim 1 wherein the melt mixing device is an extruder.

6. The method of claim 1 further comprising a step of preparing said release agent composition by mixing said release agent and said colorant and optionally one or more functional additives, wherein the one or more functional additives comprises anti-oxidants, UV stabilisers, hydrolytical stabilisers, flame retardants, catalyst quenchers or anti-static agents at a temperature above the melting temperature of said release agent.

7. A method for the manufacture of a batch of semi-finished or finished articles comprising converting the colored polymer composition obtained by the method of claim 1 into said articles by means of injection moulding, blow moulding, rotation moulding, compression moulding, sheet extrusion or profile extrusion.

8. The method of claim 1 wherein said colorant consists of Solvent Green 3, Solvent Green 28, Solvent Green 38, Pigment Green 50, Pigment Green 36, Solvent Red 52, Solvent Red 101, Solvent Red 111, Solvent Red 135, Solvent Red 169, Solvent Red 179, Solvent Red 207, Pigment Red 101, Disperse Red 22, Vat Red 41, Solvent Orange 60, Solvent Orange 63, Disperse Orange 47, Pigment Blue 29, Pigment Blue 60, Copper Phthalocyanine Pigment Blue 15.4, Phthalocyanine Blue BN, Pigment Blue PB 15, Pigment Yellow 53, Pigment Yellow 138, Pigment Yellow 139, Disperse Yellow 201, Solvent Yellow 33, Solvent Yellow 114, Solvent Yellow 93, Solvent Yellow 98, Solvent Yellow 163, Solvent Yellow 160:1, Solvent Yellow 188, Pigment Brown 24, Amino Ketone Black, chrome oxides, or a mixture of at least two of the foregoing colorants.

* * * * *